United States Patent
Li

(10) Patent No.: US 8,155,703 B2
(45) Date of Patent: Apr. 10, 2012

(54) WIRELESS DEVICE HAVING A CONFIGURABLE CAMERA INTERFACE TO SUPPORT DIGITAL IMAGE PROCESSING

(75) Inventor: Jiankun Li, Newark, CA (US)

(73) Assignee: Broadcom Corporation, Irvine, CA (US)

( * ) Notice: Subject to any disclaimer, the term of this patent is extended or adjusted under 35 U.S.C. 154(b) by 1714 days.

(21) Appl. No.: 10/956,773

(22) Filed: Oct. 1, 2004

(65) Prior Publication Data

US 2006/0073852 A1    Apr. 6, 2006

(51) Int. Cl.
*H04M 1/00* (2006.01)
(52) U.S. Cl. .................. 455/566; 348/14.12; 348/14.13; 348/211.2; 348/231.2
(58) Field of Classification Search .................. 455/566; 348/14.12, 14.13, 211.2, 231.2
See application file for complete search history.

(56) References Cited

U.S. PATENT DOCUMENTS

| | | | |
|---|---|---|---|
| 6,693,644 B1* | 2/2004 | Moriwaki et al. | 345/604 |
| 2001/0036231 A1* | 11/2001 | Easwar et al. | 375/240.19 |
| 2004/0151242 A1* | 8/2004 | Chang | 375/240.01 |
| 2004/0179122 A1* | 9/2004 | Morimoto et al. | 348/333.01 |
| 2006/0095750 A1* | 5/2006 | Nye et al. | 712/240 |

FOREIGN PATENT DOCUMENTS

| | | |
|---|---|---|
| EP | 1429506 A | 6/2004 |
| EP | 1441523 A | 7/2004 |

\* cited by examiner

*Primary Examiner* — Nick Corsaro
*Assistant Examiner* — Amanuel Lebassi
(74) *Attorney, Agent, or Firm* — Garlick & Markison; Kevin L. Smith

(57) ABSTRACT

A camera operably coupled to a configurable camera interface within a wireless terminal operable to process images in accordance with multiple data formats. This camera interface has an ARM and an image process accelerator operably coupled to the ARM. The combination receives a captured digital image having a first data format from an image sensor operably coupled to the camera interface. The accelerator is configured based on information contained within the captured digital image. The captured digital image will be processed to produce additional digital images having a differing data formats. The captured digital image and/or additional digital images will be supplied to multiple devices or clients. This configuration allows the compute intensive operations to be offloaded from the processing module onto the image process accelerator within the camera interface in order to improve the overall system efficiency.

24 Claims, 12 Drawing Sheets

WIRELESS DEVICE HAVING A CONFIGURABLE CAMERA INTERFACE TO SUPPORT DIGITAL IMAGE PROCESSING

BACKGROUND

1. Technical Field

The present invention relates generally to cellular wireless communication systems, and more particularly to a distinct configurable camera interface to support digital image processing within a wireless terminal of a cellular wireless communication system.

2. Related Art

Cellular wireless communication systems support wireless communication services in many populated areas of the world. While cellular wireless communication systems were initially constructed to service voice communications, they are now called upon to support data and video (multimedia) communications as well. The demand for video and data communication services has exploded with the acceptance and widespread use video capable wireless terminals and the Internet. Video and data communications have historically been serviced via wired connections; cellular wireless users now demand that their wireless units also support video and data communications. The demand for wireless communication system video and data communications will only increase with time. Thus, cellular wireless communication systems are currently being created/modified to service these burgeoning demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, each base station communicates with a plurality of wireless terminals operating in its cell/sectors. A BSC coupled to the base station routes voice, video, data or multimedia communications between the MSC and a serving base station. The MSC then routes these communications to another MSC or to the PSTN. Typically, BSCs route data communications between a servicing base station and a packet data network that may include and couple to the Internet. Transmissions from base stations to wireless terminals are referred to as "forward link" transmissions while transmissions from wireless terminals to base stations are referred to as "reverse link" transmissions. The volume of data transmitted on the forward link typically exceeds the volume of data transmitted on the reverse link. Such is the case because data users typically issue commands to request data from data sources, e.g., web servers, and the web servers provide the data to the wireless terminals. The great number of wireless terminals communicating with a single base station forces the need to divide the forward and reverse link transmission times amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. While GSM originally serviced only voice communications, it has been modified to also service data communications. GSM General Packet Radio Service (GPRS) operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, e.g., IS-136 and Pacific Digital Cellular (PDC).

The GSM standard specifies communications in a time divided format (in multiple channels). The GSM standard specifies a 4.615 ms frame that includes 8 slots of, each including eight slots of approximately 577 μs in duration. Each slot corresponds to a Radio Frequency (RF) burst. A normal RF burst, used to transmit information, typically includes a left side, a midamble, and a right side. The midamble typically contains a training sequence whose exact configuration depends on modulation format used. However, other types of RF bursts are known to those skilled in the art. Each set of four bursts on the forward link carry a partial link layer data block, a full link layer data block, or multiple link layer data blocks. Also included in these four bursts is control information intended for not only the wireless terminal for which the data block is intended but for other wireless terminals as well.

GPRS and EDGE include multiple coding/puncturing schemes and multiple modulation formats, e.g., Gaussian Minimum Shift Keying (GMSK) modulation or Eight Phase Shift Keying (8PSK) modulation. Particular coding/puncturing schemes and modulation formats used at any time depend upon the quality of a servicing forward link channel, e.g., Signal-to-Noise-Ratio (SNR) or Signal-to-Interference-Ratio (SIR) of the channel, Bit Error Rate of the channel, Block Error Rate of the channel, etc. As multiple modulation formats may be used for any RF burst, wireless communication systems require significant processing ability to encode and decode the information contained within the RF bursts. This decision may be further influenced by changing radio conditions and the desired quality level to be associated with the communications.

Video coding standards typically provide video representation in the form of a sequence of rectangular two-dimensional frames. As software is becoming increasingly more powerful with improved microelectronic technologies providing new programmable processors, additional functionalities may be added. These include the application of multimedia content or visual information in a mobile connection. Already today wireless terminals are not limited to only voice communications. Other types of data including real time or streaming multimedia may be provided.

The need for visual communication is much stronger when using a mobile wireless device utilized in multiple environments. Users want access to this audiovisual information in real time. Correspondingly, manufacturers have chosen to provide image capture devices with varying capabilities. For example, camera sensors or image capture devices with greatly varying capabilities may be incorporated within wireless terminals that utilize a common or similar base platform. This allows manufactures to provide a family of products with varying capabilities of the end product.

Multimedia must be of acceptable quality at low enough rates to be effectively communicated in the cellular wireless environment. The motion picture expert group (MPEG) standard addresses these emerging needs. These standards include standards such as MPEG 4 and MPEG 7 which specify a way of describing various types of multimedia information, including still pictures, video, speech, audio, graphics, 3D models, and synthetic audio and video. The MPEG 4 standard was conceived with the objective of obtaining significantly better compression ratios than could be achieved by conventional coding techniques. However, to achieve low data rates often requires compute intensive operations by the processors. To further complicate these issues, format changes may be required between the camera sensor or image capture device and the onboard or preview display and image encoder. Additionally the MPEG-1/2/4 and H.261/H.263 video compression standards rely heavily on computationally demanding algorithms.

The varying image formats and multimedia standards place ever-growing demands on the processor within the wireless environment. Unlike a desktop computer coupled to a network via a landline connection a mobile wireless terminal will have a limited data rate between itself and the servicing base station. Additionally, the processors within the wireless terminal are assigned multiple processing duties. The increased processing associated with the required image formats associated with various client devices require additional processing power in order to maintain real time or streaming audio/visual communications. The addition of these processing requirements within the wireless terminal requires new methods with which to balance the processing requirements of the system processor while maintaining these real time audio/visual communications.

BRIEF SUMMARY OF THE INVENTION

In order to overcome the shortcomings of prior devices, the present invention provides a camera having a configurable camera interface within a wireless terminal operable process images in accordance with multiple data formats. This camera interface has an advanced reduced instruction set computer (RISC) machine (ARM) and an image process accelerator operably coupled to the ARM. The combination of the ARM and the accelerator receives an output or captured digital image having a first data format from an image sensor operably coupled to the camera interface. The accelerator is configured based on information contained within the captured digital image. The captured digital image will be processed to produce a second digital image having a second data format. The first data format and second data format differ. The captured digital image and second digital image will be supplied to two separate devices. In one particular embodiment, the first data format and second data format are selected from the RGB format, UYVY format, YUV12 format, YUV format, or other like format known to those skilled in the art. Furthermore, the first device and second device may be a preview display and a digital image encoder. Thus, a captured digital image and an RGB format may be processed by the camera interface to produce a second digital image in a YUV format for the digital image encoder.

Similarly, an image sensor that captures a digital image may do so in multiple formats, such as the RGB, YUV formats, etc. For the case of a wireless terminal where a LCD display is used to preview a captured digital image and a digital image encoder is used to send the digital image, it may become necessary for the captured digital image provided by the image sensor to be converted to at least one additional format.

A second embodiment provides a wireless terminal that has a radio frequency (RF) front end, a baseband processor communicatively coupled to the RF front end. An image capture device is operable to capture digital images which are displayed within a display operable to preview the captured digital image after being processed through a configurable camera interface. The configurable camera interface further includes an ARM and an image process accelerator wherein the camera interface is operable to receive the captured digital image having a first data format. The accelerator is configured based on information contained within the captured digital image. The camera interface processes the captured digital image to produce a second digital image having a second data format that differs from that of the first data format. The captured digital image is provided to a first device while the second digital image is provided to a second device. As previously stated, the first and second data format may include the RGB format, UYVY format, YUV12 format, or YUV format. The first and second device may include but should not be limited to devices such as a preview display or a digital image encoder.

Additionally, resolution differences between the captured digital image and those associated with the preview display or other end devices which will use the digitally encoded image, make it desirable that the camera interface be able to decimate the captured digital image so that unnecessary processing is not performed on the image to be presented in the preview display or processed by another end use device associated with the digital image encoder. This decimation may be divided between the ARM and accelerator of the camera interface. Thus, the accelerator may be configured to convert image data of any of the above-identified formats to any other above-identified format, as well as decimate the digital image.

Yet another embodiment provides a method to process captured digital images within a wireless terminal. To do this, the digital image is first captured with an image capture device, such as a camera sensor or image capture device. The mode of operation of a configurable camera interface is determined from a data format of the captured digital image. Then the processing of the captured digital image between an ARM and an image process accelerator within the configurable camera interface is divided between the ARM and image process accelerator based on the data format of the captured digital image. The image processor accelerator may be configured based on the data format of the captured digital image. Then, the captured digital image is processed by the configurable camera interface from a first digital format to produce a second digital image having second data format. The captured digital image or second digital image may be sent to either a first or second device. The device that the digital images are sent to will be compatible with the format of the digital image.

Other features and advantages of the present invention will become apparent from the following detailed description of the invention made with reference to the accompanying drawings.

DETAILED DESCRIPTION OF THE DRAWINGS

Figure 1:
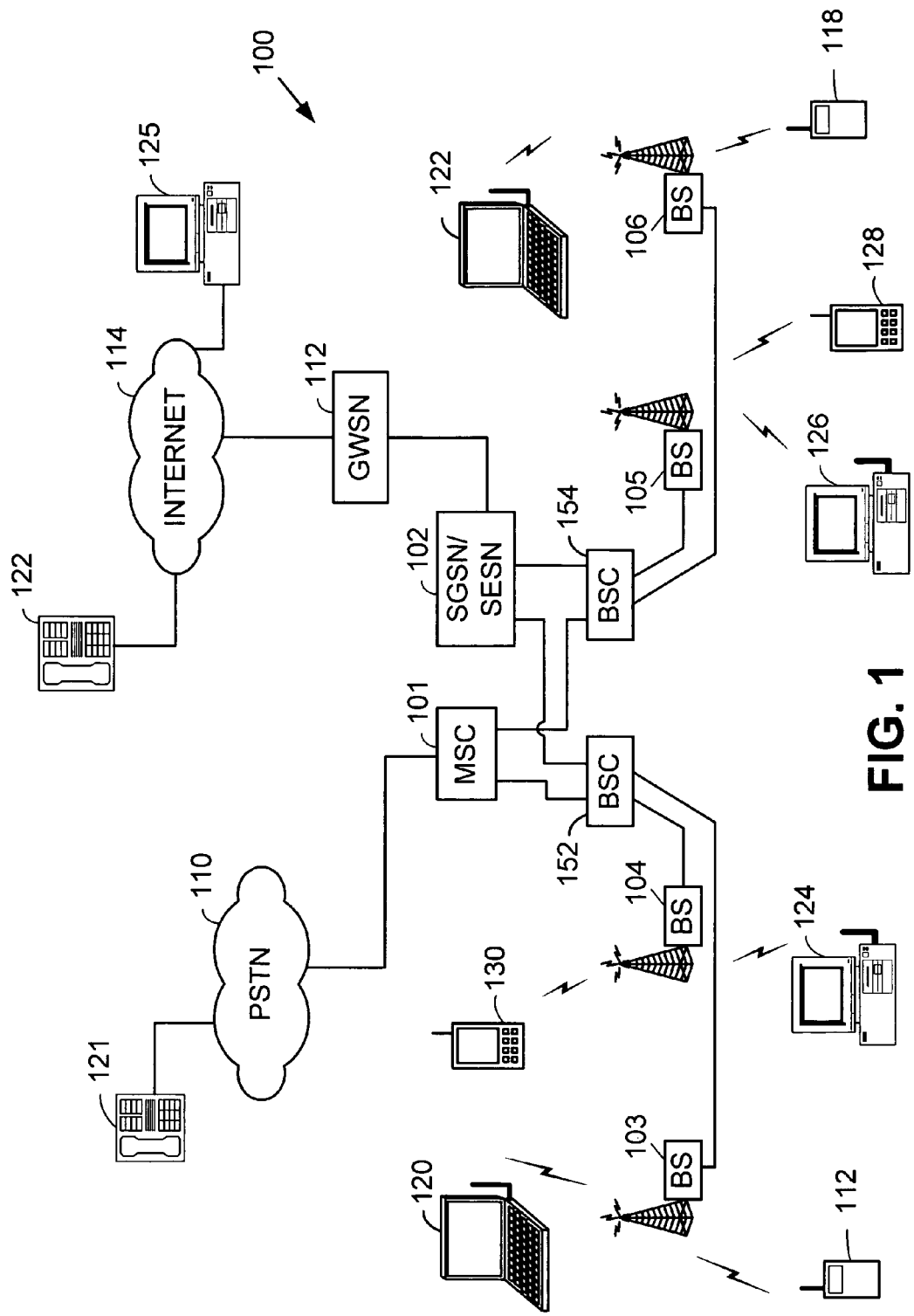
FIG. 1 is a system diagram illustrating a portion of a cellular wireless communication system that supports wireless terminals operating according to the present invention.

FIG. 1 is a system diagram illustrating a portion of a cellular wireless communication system 100 that supports wireless terminals operating according to the present invention. The cellular wireless communication system 100 includes a Mobile Switching Center (MSC) 101, Serving GPRS Support Node/Serving EDGE Support Node (SGSN/SESN) 102, base station controllers (BSCs) 152 and 154, and base stations 103, 104, 105, and 106. The SGSN/SESN 102 couples to the Internet 114 via a GPRS Gateway Support Node (GGSN) 112. A conventional multimedia capable terminal 121 couples to the PSTN 110. Multimedia capable terminal 123 and a personal computer 125 couple to the Internet 114. The MSC 101 couples to the Public Switched Telephone Network (PSTN) 110.

Each of the base stations 103-106 services a cell/set of sectors within which it supports wireless communications. Wireless links that include both forward link components and reverse link components support wireless communications between the base stations and their serviced wireless terminals. These wireless links support digital voice, video, multimedia, and data communications. The cellular wireless communication system 100 may also be backward compatible in supporting analog operations as well. The cellular wireless communication system 100 supports the Global System for Mobile telecommunications (GSM) standard and also the Enhanced Data rates for GSM (or Global) Evolution (EDGE) extension thereof. The cellular wireless communication system 100 may also support the GSM General Packet Radio Service (GPRS) extension to GSM. However, the present invention is also applicable to other standards as well, e.g., TDMA standards, CDMA standards, etc.

Wireless terminals 116, 118, 120, 122, 124, 126, 128, and 130 couple to the cellular wireless communication system 100 via wireless links with the base stations 103-106. As illustrated, wireless terminals may include video and multimedia capable cellular telephones 116 and 118, laptop computers 120 and 122, desktop computers 124 and 126, and data terminals 128 and 130. However, the wireless system supports communications with other types of wireless terminals as known to those skilled in the art as well. As is generally known, devices such as laptop computers 120 and 122, desktop computers 124 and 126, data terminals 128 and 130, and cellular telephones 116 and 118, are enabled to "surf" the Internet 114, transmit and receive data, audio and video communications. Many of these data operations have significant download data-rate (forward link) requirements and upload data-rate (reverse link) requirements in order to support video and multimedia communications. Some or all of the wireless terminals 116-130 are therefore enabled to support the EDGE operating standard, the GSM standard and may support the GPRS standard.

Wireless terminals 116-130 support the pipelined processing of received RF bursts in slots of a GSM frame so that a plurality of slots in each sub-frame of a GSM frame are allocated for forward link transmissions to a single wireless terminal. In one embodiment, a number of slots of a GSM frame are allocated for forward link transmissions to a wireless terminal such that the wireless terminal must receive and process a number of RF bursts, e.g., 2, 3, 4, or more RF bursts, in each GSM frame. The wireless terminal is able to process the RF bursts contained in these slots and still service reverse link transmissions and the other processing requirements of the wireless terminal.

Figure 2:
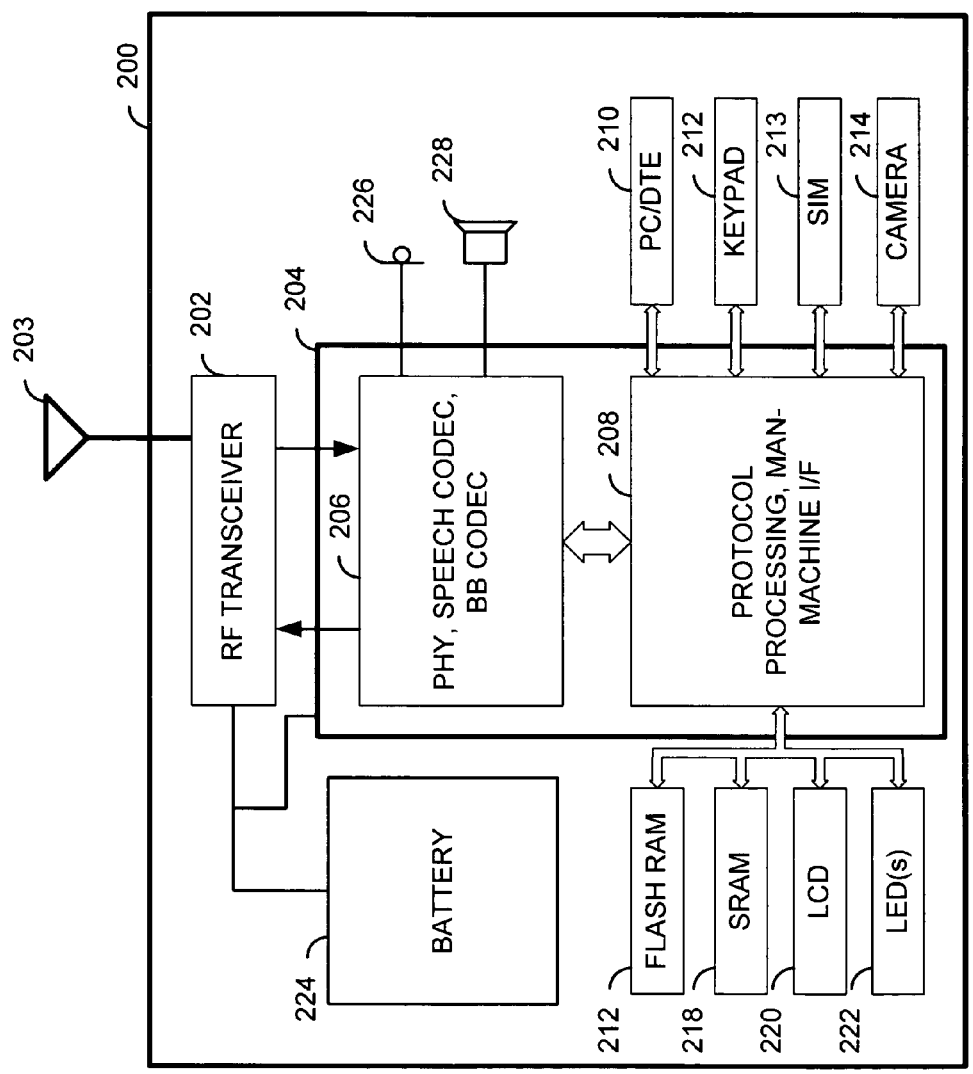
FIG. 2 is a block diagram functionally illustrating a wireless terminal constructed according to the present invention.

FIG. 2 is a block diagram functionally illustrating a wireless terminal 200 constructed according to the present invention. The wireless terminal 200 of FIG. 2 includes an RF transceiver 202, digital processing components 204, and various other components contained within a case. The digital processing components 204 includes two main functional components, a physical layer processing, speech COder/DEcoder (CODEC), and baseband CODEC functional block 206 and a protocol processing, man-machine interface functional block 208. A Digital Signal Processor (DSP) is the major component of the physical layer processing, speech COder/DECoder (CODEC), and baseband CODEC functional block 206 while a microprocessor, e.g., Reduced Instruction Set Computing (RISC) processor, is the major component of the protocol processing, man-machine interface functional block 208. The DSP may also be referred to as a Radio Interface Processor (RIP) while the RISC processor may be referred to as a system processor. However, these naming conventions are not to be taken as limiting the functions of these components.

The RF transceiver 202 couples to an antenna 203, to the digital processing components 204, and also to a battery 224 that powers all components of the wireless terminal 200. The physical layer processing, speech COder/DECoder (CODEC), and baseband CODEC functional block 206 couples to the protocol processing, man-machine interface functional block 208 and to a coupled microphone 226 and speaker 228. The protocol processing, man-machine interface functional block 208 couples to a Personal Computing/Data Terminal Equipment interface 210, a keypad 212, a Subscriber Identification Module (SIM) port 213, a camera 214, a flash RAM 216, an SRAM 218, a LCD 220, and LED(s) 222. The camera 214 and LCD 220 may support either/both still pictures and moving pictures. Thus, the wireless terminal 200 of FIG. 2 supports video services as well as audio services via the cellular network.

Figure 3:
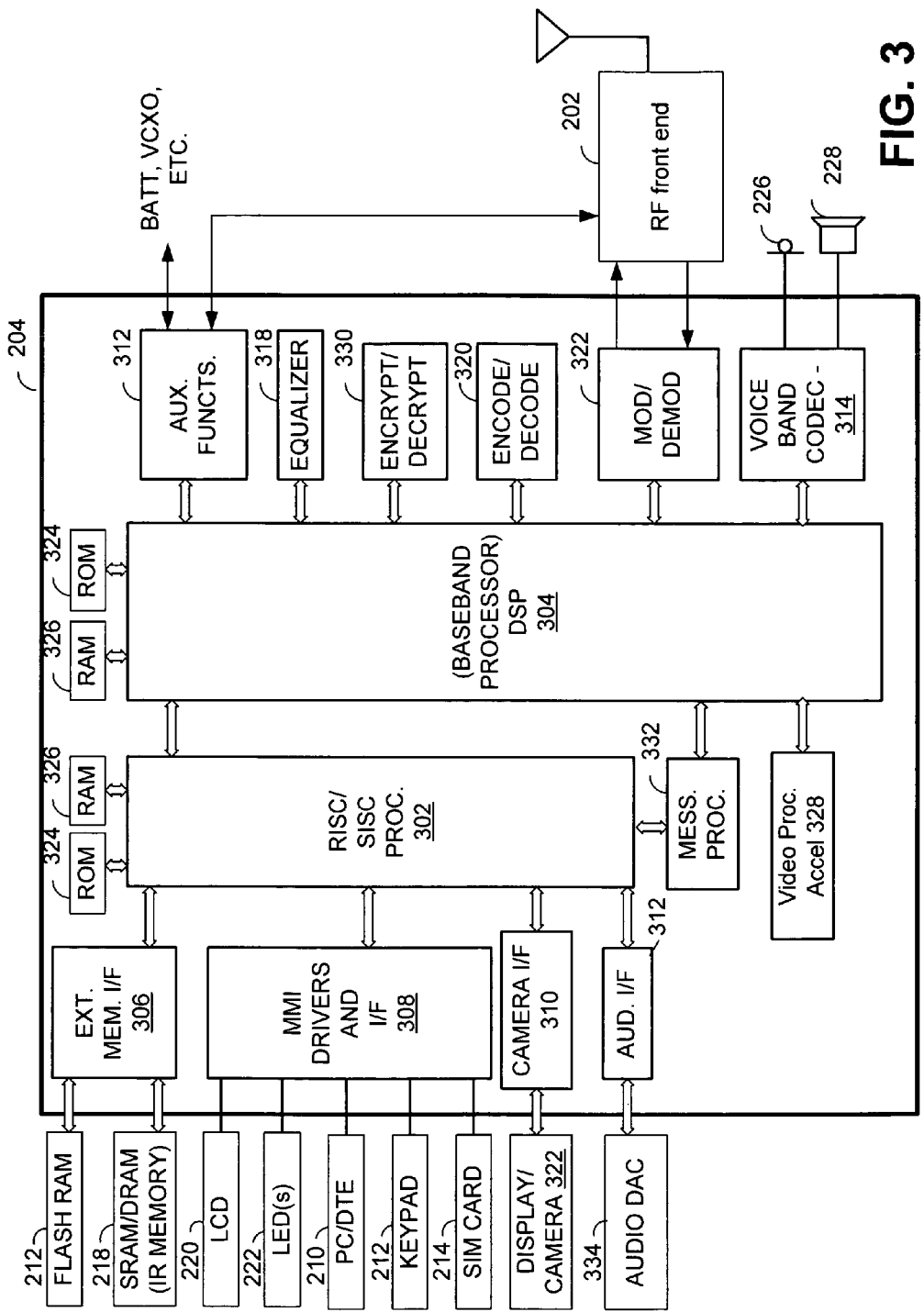
FIG. 3 is a block diagram illustrating in more detail the wireless terminal of FIG. 2, with particular emphasis on the digital processing components of the wireless terminal.

FIG. 3 is a block diagram illustrating in more detail the wireless terminal of FIG. 2, with particular emphasis on the digital processing components of the wireless terminal. The digital processing components 204 include a system processor 302, a baseband processor 304, and a plurality of supporting components. The supporting components include an external memory interface 306, MMI drivers and I/F 308, a camera I/F 310, a motion processor accelerator 311, an audio I/F 312, a voice band CODEC 314, auxiliary functions 316, a modulator/demodulator 322, ROM 324, RAM 326 and a plurality of processing modules. In some embodiments, the modulator/demodulator 322 is not a separate structural component with these functions being performed internal to the baseband processor 304.

The processing modules are also referred to herein as accelerators, co-processors, processing modules, or otherwise, and include auxiliary functions 316, an equalizer module 318, an enCOder/DECoder (CODEC) processing module 320, and a video process accelerator module 328. The interconnections of FIG. 3 are one example of a manner in which these components may be interconnected. Other embodiments support additional/alternate couplings. Such coupling may be direct, indirect, and/or may be via one or more intermediary components. The motion processor accelerator 311, optional video processing accelerator 328, and operations of the DSP 304 in processing video data will be described in more detail with reference to FIGS. 9-21. These processor accelerators may further include arithmetic logic units (ALU) operable to perform specific tasks such as motion processing. The ALUs receive data from and output data to registers operable to temporarily store an input for or an output of the at least one ALU. These registers allow the data to be processed to be transferred between the DSP and accelerators.

RAM and ROM service both the system processor 302 and the baseband processor 304. Both the system processor 302 and the baseband processor 304 may couple to shared RAM 326 and ROM 324, couple to separate RAM, coupled to separate ROM, couple to multiple RAM blocks, some shared, some not shared, or may be served in a differing manner by the memory. In one particular embodiment, the system processor 302 and the baseband processor 304 couple to respective separate RAMs and ROMs and also couple to a shared RAM that services control and data transfers between the devices. The processing modules 316, 318, 320, 322, and 328 may coupled as illustrated in FIG. 3 but may also coupled in other manners in differing embodiments.

The system processor 302 services at least a portion of a serviced protocol stack, e.g., GSM/GPRS/EDGE protocol stack. The baseband processor 304 in combination with the modulator/demodulator 322, RF transceiver, equalizer module 318, and/or encoder/decoder module 320 service the Physical Layer (PHY) operations performed by the digital processing components 204. The baseband processor 304 may also services a portion of the GSM/GPRS/EDGE protocol stack.

Still referring to FIG. 3, the baseband processor 304 controls the interaction of the baseband processor 304 and equalizer module 318. As will be described further, the baseband processor 304 is responsible for causing the equalizer module 318 and the CODEC processing module 320 to process received RF bursts that reside within slots of a GSM frame. In the particular embodiment of FIGS. 2 and 3, with single RF front end 202, wireless terminal 200 may receive and process RF bursts in up to four slots of each GSM frame, i.e., be assigned four slots for forward link transmissions in any particular GSM frame. In another embodiment in which the wireless terminal 200 includes more than one RF front end, the wireless terminal 200 may be assigned more than four slots in each sub-frame of the GSM frame. In this case, required transmit operations would be performed using a second RF front end while a first RF front end would perform the receive operations. When the forward link transmissions and the reverse link transmissions occupy different channels with sufficient frequency separation, and the wireless terminal otherwise supports full duplex operations, the wireless terminal could receive and transmit at the same time.

The combination of the RF front end 202, and base band processor 204, which may include an optional CODEC processing module, receive RF communications that may contain both audio and visual information from the servicing base station. In one embodiment the RF front end 202 and base band processor 204 receive and process RF bursts from servicing base stations. The combination of RF front end 202 and base band processor 204 are operable to receive RF bursts transmitted according to a transmission scheme wherein the transmission scheme includes both a modulation format and a coding format. Base band processor 204 to produce a data block decodes sequences of soft decisions, extracted from the RF bursts. The sequence of soft decisions may decode successfully into the data block as indicated by error correction coding results.

Figure 4:
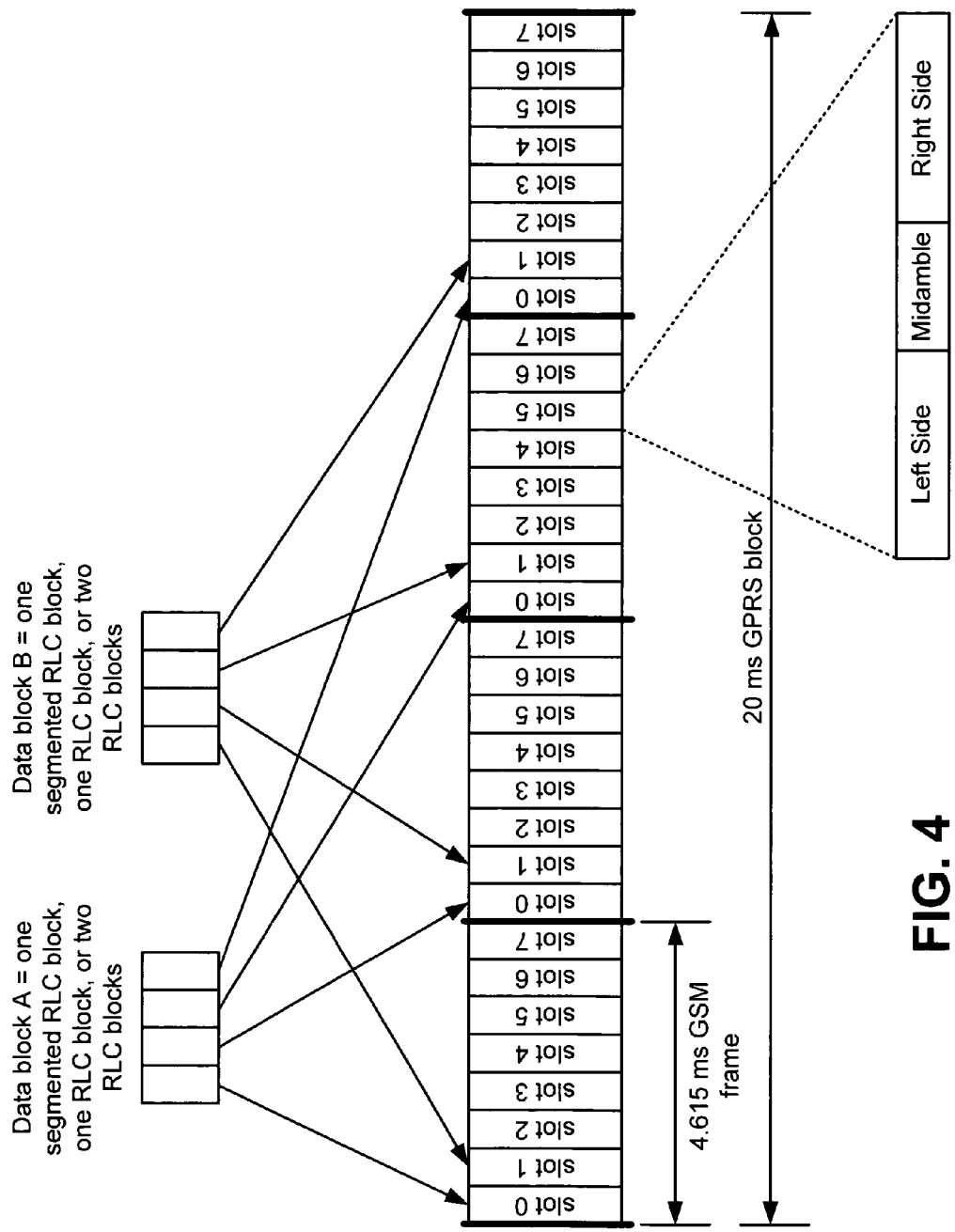
FIG. 4 is a block diagram illustrating the general structure of a GSM frame and the manner in which data blocks are carried by the GSM frame.

FIG. 4 is a block diagram illustrating the general structure of a GSM frame and the manner in which data blocks that may contain audio, video, and data communications, are carried by the GSM frame. The GSM frame is 4.615 ms in duration, including guard periods, and each of which includes eight slots, slots 0 through 7. Each slot is approximately 577 µs in duration, includes a left side, a midamble, and a right side. The left side and right side of a normal RF burst of the time slot carry data while the midamble is a training sequence.

The RF bursts of four time slots of the GPRS block carry a segmented RLC block, a complete RLC block, or two RLC blocks, depending upon a supported Modulation and Coding Scheme (MCS) mode. For example, data block A is carried in slot 0 of sub-frame 1, slot 0 of sub-frame 2, slot 0 of sub-frame 3, and slot 0 of sub-frame 3. Data block A may carry a segmented RLC block, an RLC block, or two RLC blocks. Likewise, data block B is carried in slot 1 of sub-frame 1, slot 1 of sub-frame 2, slot 1 of sub-frame 3, and slot 1 of sub-frame 3. The MCS mode of each set of slots, i.e., slot n of each sub-frame, for the GSM frame is consistent for the GSM frame. Further, the MCS mode of differing sets of slots of the GSM frame, e.g., slot 0 of each sub-frame vs. any of slots 1-7 of each sub-frame, may differ. This ability allows LA to be implemented. As will be described further with reference to FIG. 5, the wireless terminal 200 may be assigned multiple slots for forward link transmissions that must be received and processed by the wireless terminal 200.

Figure 5:
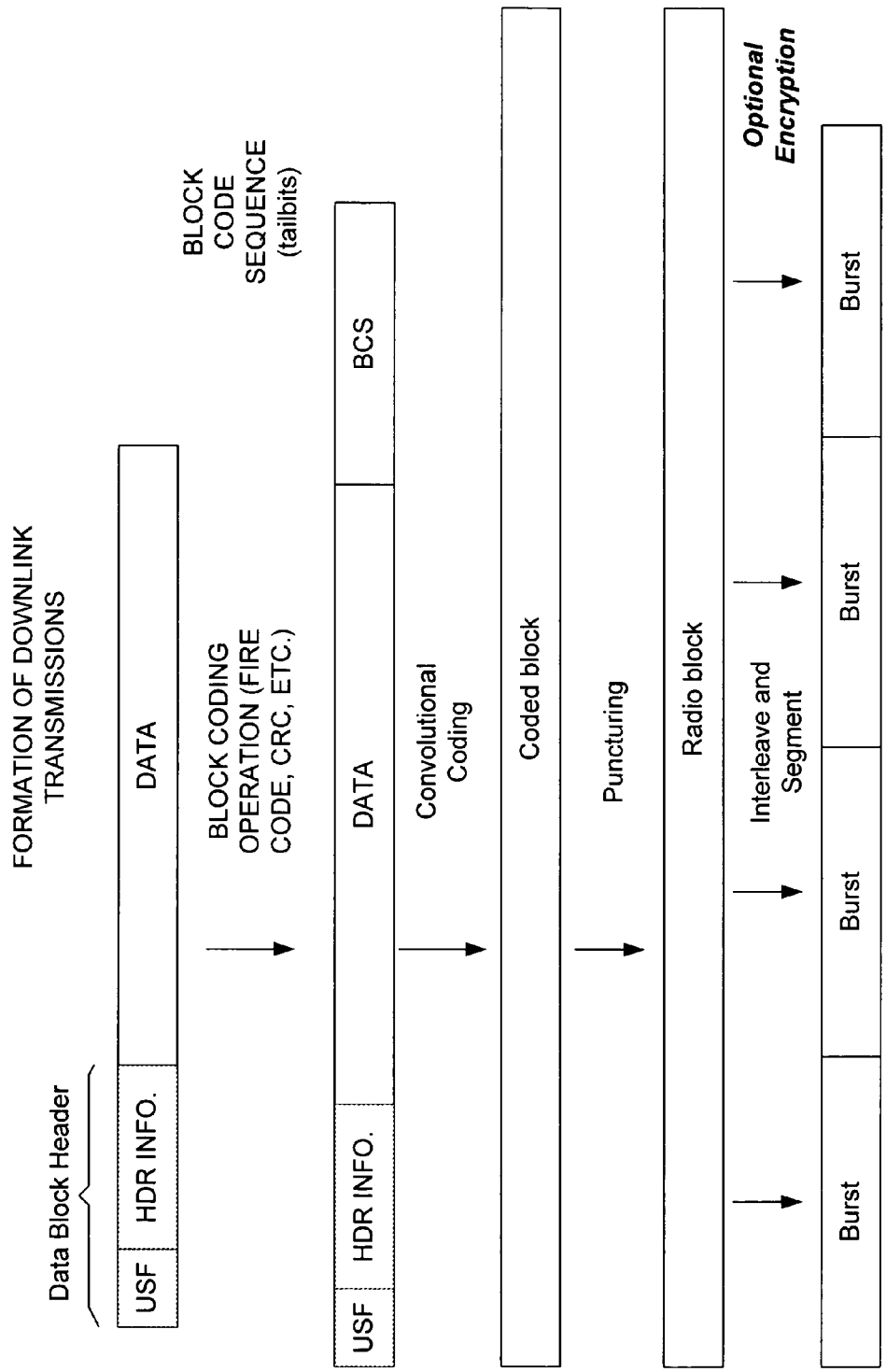
FIG. 5 is a block diagram illustrating the formation of down link transmissions.

FIG. 5 depicts the various stages associated with mapping data into RF bursts. A Data Block Header and Data are initially unencoded. The block coding operations perform the outer coding for the data block and support error detection/ correction for data block. The outer coding operations typically employ a cyclic redundancy check (CRC) or a Fire Code. The outer coding operations are illustrated to add tail bits and/or a Block Code Sequence (BCS), which is/are appended to the Data. After block coding has supplemented the Data with redundancy bits for error detection, calculation of additional redundancy for error correction to correct the transmissions caused by the radio channels. The internal error correction or coding scheme of GSM is based on convolutional codes.

Some coded bits generated by the convolutional encoder are punctured prior to transmission. Puncturing increases the rate of the convolutional code and reduces the redundancy per data block transmitted. Puncturing additionally lowers the bandwidth requirements such that the convolutional encoded signal fits into the available channel bit stream. The convolutional encoded punctured bits are passed to an interleaver, which shuffles various bit streams and segments the interleaved bit streams into the 4 bursts shown.

Each RF burst has a left side, a midamble, and a right side. The left side and right side contain data. The midamble consists of predefined, known bit patterns, the training sequences, which are used for channel estimation to optimize reception with an equalizer and for synchronization. With the help of these training sequences, the equalizer eliminates or reduces the intersymbol interferences, which can be caused by propagation time differences of multipath propagation. A number of training sequences are defined for normal RF bursts in the GSM standard. However, the exact configuration of the training sequences may depend on the modulation format used. Each set of four bursts typically utilizes the same modulation format. By analyzing the training sequence one can determine the modulation format.

Figure 6:
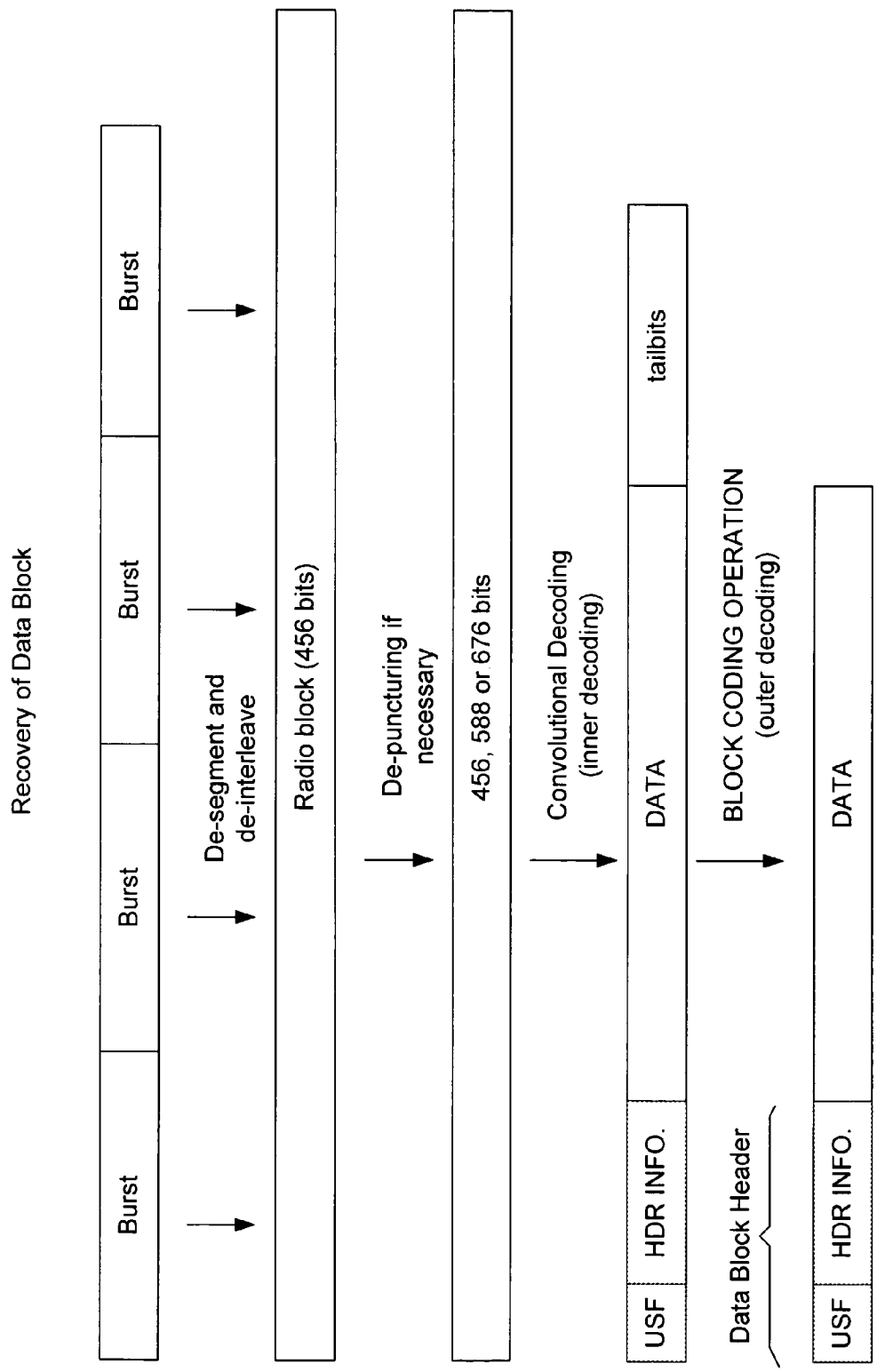
FIG. 6 is a block diagram illustrating the recovery of a data block from a down link transmissions.

FIG. 6 is a block diagram depicting the various stages associated with recovering a data block from RF bursts. Four RF bursts making up a data block are received and processed. Once all four RF bursts have been received, the RF bursts are combined to form an encoded data block. The encoded data block is then depunctured (if required), decoded according to an inner decoding scheme, and then decoded according to an outer decoding scheme. For MCS 1-4, the decoded data block includes the data block header and the data, for MCS 5-9, data block and header block are coded separately. Successful decoding may be signaled by appropriate tailbits appended to the data following convolutional decoding (error correction coding).

Figure 7:
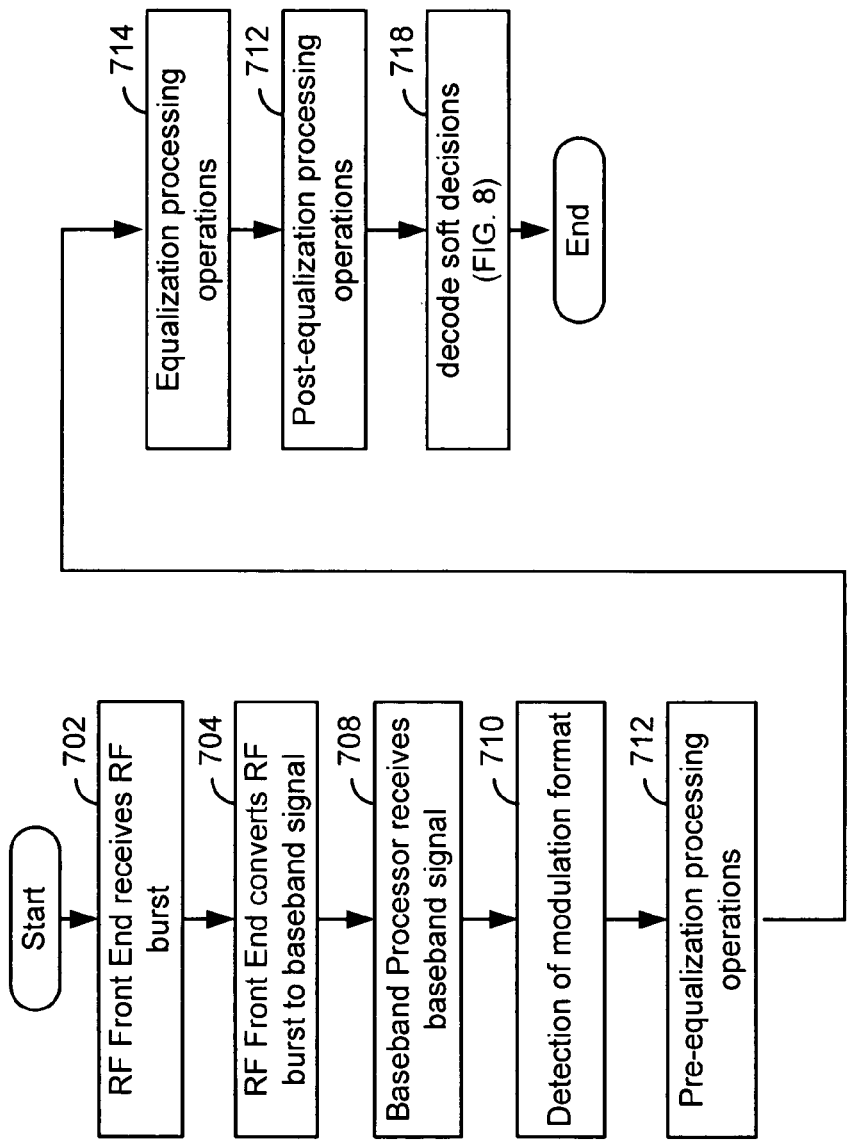
FIG. 7 is a flow chart illustrating operation of a wireless terminal in receiving and processing a RF burst.
Figure 8:
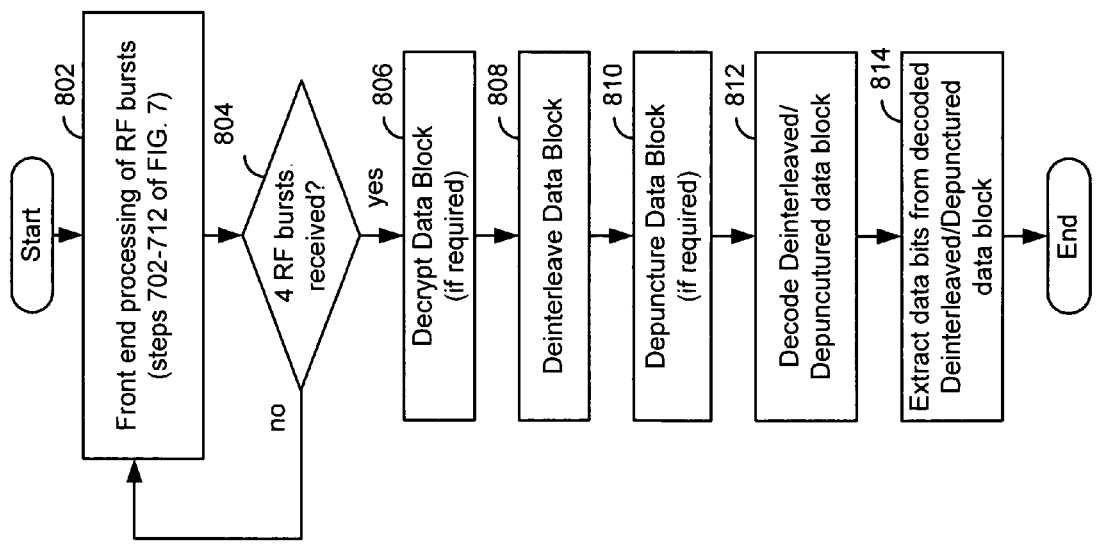
FIG. 8 is a flow chart illustrating operations to recover a data block.

FIGS. 7 and 8 are flow charts illustrating operation of a wireless terminal 200 in receiving and processing RF bursts to recover a data block. The operations illustrated correspond to a single RF burst in a corresponding slot of GSM frame. The RF front end 202, the baseband processor 304, and the equalizer module 318 illustrated in FIG. 3 perform these operations. These operations are generally called out as being performed by one of these components. However, the split of processing duties among these various components may differ without departing from the scope of the present invention.

A single processing device or a plurality of processing devices operably coupled to memory performs the processing duties. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions may be described later.

Referring particularly to FIG. 7, operation commences with the RF front end 202 receiving an RF burst in a corresponding slot of a GSM frame (step 702). The RF front end 202 then converts the RF burst to a baseband signal (step 704). Upon completion of the conversion, the RF front end 202 stores the converted baseband signal. When needed the baseband processor samples the converted baseband signal from the RF front end. Thus, as referred to in FIG. 7, the RF front end 202 performs steps 702-704.

Operation continues with the baseband processor 304 receiving the baseband signal (step 708). In a typical operation, the RF front end 202, the baseband processor 304, or modulator/demodulator 322 samples the analog baseband signal to digitize the baseband signal. After receipt of the baseband signal (in a digitized format), the baseband processor 304 performs detection of a modulation format of the baseband signal (step 710). This detection of the modulation format determines the modulation format of the corresponding baseband signal. Proper determination of the modulation format is necessary in order to properly estimate the channel quality from the SNR of the channel. According to the GSM standard, the modulation format will be either Gaussian Minimum Shift Keying (GMSK) modulation or Eight Phase Shift Keying (8PSK) modulation. The baseband processor 304 makes the determination (step 712) and appropriately processes the RF bursts based upon the detected modulation format.

The baseband processor performs pre-equalization processing of the RF burst in step 712. The pre-equalization processing operations produce a processed baseband signal. Upon completion of these pre-equalization processing operations, the baseband processor 304 issues a command to the equalizer module 318.

The equalizer module 318, upon receiving the command, prepares to equalize the processed baseband signal based upon the modulation format, e.g., GMSK modulation or 8PSK modulation in step 714. The equalizer module 318 receives the processed baseband signal, settings, and/or parameters from the baseband processor 304 and equalizes the processed baseband signal.

After equalization, the equalizer module 318 then issues an interrupt to the baseband processor 304 indicating that the equalizer operations are complete for the RF bursts. The baseband processor 304 then receives the soft decisions from the equalizer module 318. Next, the baseband processor 304 performs "post-equalization processing" as shown in step 716. This may involve determining an average phase of the left and right sides based upon the soft decisions received from the equalizer module 318 and frequency estimation and tracking based upon the soft decisions received from the equalizer module 318.

The sequences of soft decisions are decoded in step 718 to produce the data bits containing the audio, video and data communications. One particular method of decoding the soft decisions is further detailed in FIG. 8. While the operations of FIG. 7 are indicated to be performed by particular components of the wireless terminal, such segmentation of operations could be performed by differing components. For example, the baseband processor 304 or system processor 302 in other embodiments could perform the equalization operations. Further, the baseband processor 304 or the system processor 302 in other embodiments could also perform decoding operations.

FIG. 8 is a flow chart illustrating operations to decode a data block. Operations commence with receiving and processing RF bursts (front-end processing of RF bursts) in step 802 and as described with reference to steps 702-716 of FIG. 7. After receiving the four RF bursts that complete an EDGE or GPRS data block, as determined at step 804, operation proceeds to step 806.

Data recovery begins in step 806 where, if necessary, the data block is decrypted. The data block is then de-interleaved (step 808) according to a particular format of the data block, e.g. MCS-1 through MCS-9. The data block is then de-punctured (step 810). At step 812, the de-interleaved and de-punctured data block is decoded. Decoding operations may include combining previously received copies of the data block with the current copy of the data block. Data bits of the decoded data block are then processed further (step 814).

These data bits may take the form of encoded video data to be displayed on the wireless terminal. FIGS. 9-19 address the decoding real time video communications contained with in forward link communications and encoding of real time video communications for reverse link communications.

Figure 9:
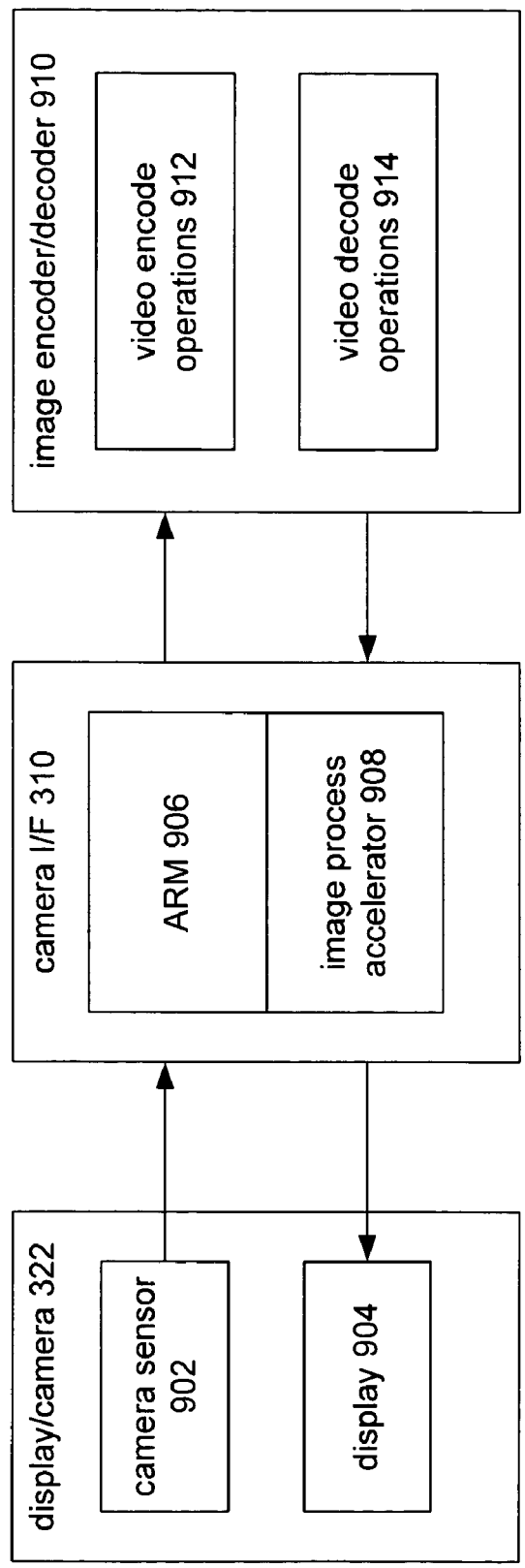
FIG. 9 provides a functional block diagram of a configurable camera interface.

FIG. 9 is a block diagram illustrating the processing of a captured digital image within a wireless terminal. Camera sensor 902 or another like image capture device captures a digital image which is supplied to the camera interface 310. The mode of operation of a configurable camera interface 310 is determined from a data format or other information contained within the captured digital image. This format and resolution of the captured digital image are determined by the capturing camera sensor 902. ARM 906 and image process accelerator 908 share the processing of the captured digital image based on the data format and resolution of the captured digital image. The image processor accelerator may be configured based on the data format of the captured digital image. Then, the captured digital image is processed by the configurable camera interface from a first digital format to produce at least one additional digital image having at least one differing data format. The captured digital image or additional digital image may be sent to a client device.

The device that the digital images are sent to will be compatible with the format of the digital image. For example, should the camera sensor 902 output a captured digital image in an RGB format while the image encoder 910 requires an YUV format, the image process accelerator 908 is configured to handle compute intensive operations associated with translating the captured RGB format digital image into a YUV format digital image to be provided to image encoder 910. In this instance, should display 904 require an RGB format digital image, the captured digital image captured may be provided by camera interface 310 to display 904. The image provided to the display may be decimated by camera interface 310 when a resolution difference exists between the camera sensor 902 and display 904. In other embodiments, the first and second data format may be chosen from the RGB format, UYVY format, YUV12 format, YUV format or other like formats known to those skilled in the art.

Image encoder/decoder 910 may service JPEG, MPEG-1/2/4, H.261/H.263, other like image/video compression standards, or any other like video encoding/decoding operations as well. MPEG4 is particularly suited to wireless video phones as MPEG4 allows a reasonable reproduction of the video frame with a relatively low data rate.

Camera 902 and display 904 are built into the wireless terminal and correspond to LCD and Camera 322 of FIG. 3. Camera interface 310 processing includes format conversions, such as UYVY format decimation from camera interface output to YUV12 format, processing an image to the required resolution of the display, dithering, and/or conversion from YUV12 format to RGB color format, and noise reduction. Encoder functions performed by image encoder 910 may include motion processing operations where video is captured with camera sensor 902. This encoder may include dedicated hardware, such as a motion processor accelerator and optional video processor accelerator 328 as shown in FIG. 3. The manner in which these duties are split will be described further.

Figure 10:
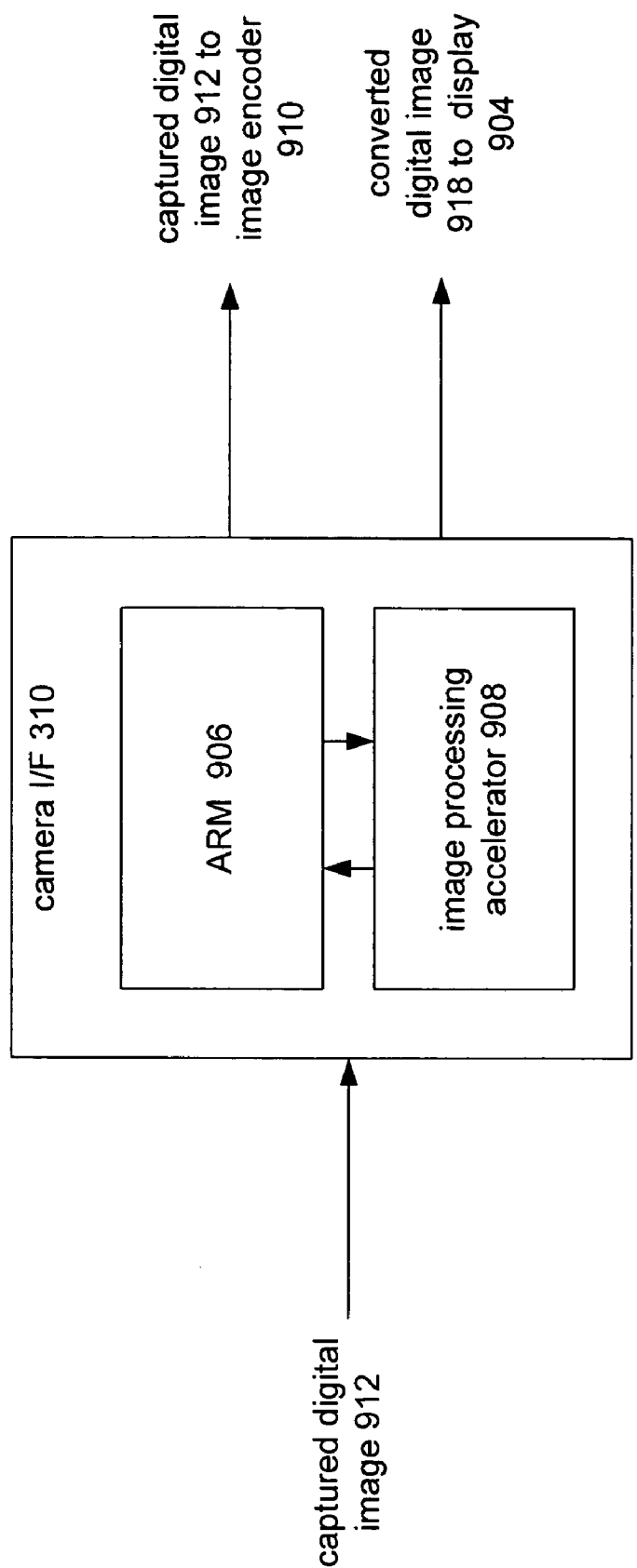
FIG. 10 provides a functional block diagram of a configurable camera interface within a wireless terminal.

FIG. 10 is a block diagram illustrating one specific embodiment where the captured digital image is within an YUV12 format. The display requires that the captured digital image 916 be received within the RGB format. To achieve this, the captured digital image is converted from the YUV12 format to the RGB format and supplied to the display. The captured digital image may be passed to the encoder where the encoder requires a YUV12 formatted digital image. Optionally, the client devices such as the display or encoder may both require that the image be translated from the original format to a second or third format prior to being supplied to the client device. In this instance, the accelerator may process one image for each client device prior to continuing to process additional images.

Figure 11:
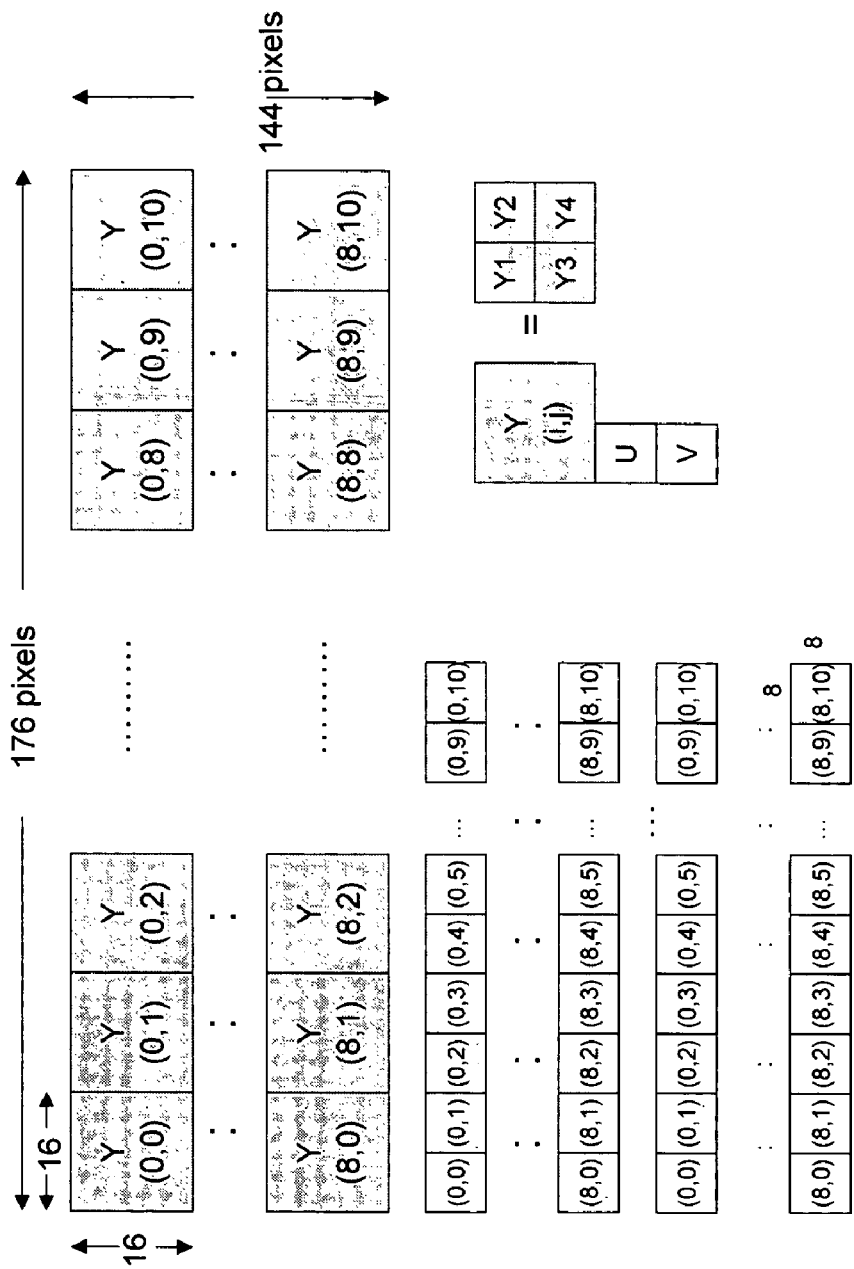
FIG. 11 provides a block diagram of the data structure or potential data structure utilized by image information discussed within the present invention.

One exemplary image format and data structure of a captured frame may be described with reference to FIG. 11. The particulars of the data structure inform the camera interface which required operations are to be performed. At a macro-block level, each macro-block contains 4 luminance blocks Y0, Y1, Y2, Y3, two chrominance blocks U and V. Each block contains 8×8 pixel information. The pixels of the captured frame in YUV formats are store in the memory where an example of QCIF frame is used. Each macro-block is uniquely identified by its location (x_pos, y_pos) in the memory. The pixels of the corresponding Y luminance and the two chrominance blocks are identified by their individual starting memory address. For example if the memory addresses of the Y, U & V for the captured frame start at pY, pU and pV, respectively, then the address pointer for Y1-Y4, U, V blocks of the macro-block (x_pos, y_pos) are as follows:

$$-Y1: pY + y\_pos * 16 * \text{frame\_width} + x\_pos * 16$$

$$-Y2: pY + y\_pos * 16 * \text{frame\_width} + x\_pos * 16 + 8$$

$$-Y3: pY + y\_pos * 16 * \text{frame\_width} + x\_pos * 16 + 8 * \text{frame\_width}$$

$$-Y4: pY + y\_pos * 16 * \text{frame\_width} + x\_pos * 16 + 8 * \text{frame\_width} + 8$$

$$-U: pU + y\_pos * 8 * \frac{\text{frame\_width}}{2} + x\_pos * 8$$

$$-V: pV + y\_pos * 8 * \frac{\text{frame\_width}}{2} + x\_pos * 8$$

Interface control registers for the ARM are used to determine the mode of operation of the image process accelerator. A configuration register may be used by the ARM to command the accelerator to conduct a given mode of operation. While the accelerator is performing a given operation on a current Macro-block, ARM can simultaneously perform other operations on a previous Macro-block. Therefore, save overall encoding time for a given video frame compared to the encoding algorithm using complete software based solution.

Writing to the configuration register triggers a particular module or ALU of the accelerator to process the data. The module performs the process as indicated by the contents of the configuration register. An interrupt may be issued when the image process accelerator module completes this process.

The driver code is transparent to the user of the hardware accelerator. When functioning to translate the image from a first data format to a second data format various parameters may be declared to pass/obtain relevant information to/from the accelerator. Prior to calling the interface function, the camera interface or ARM may allocate memory to the captured frame, and the output buffers that hold the results.

Figure 12:
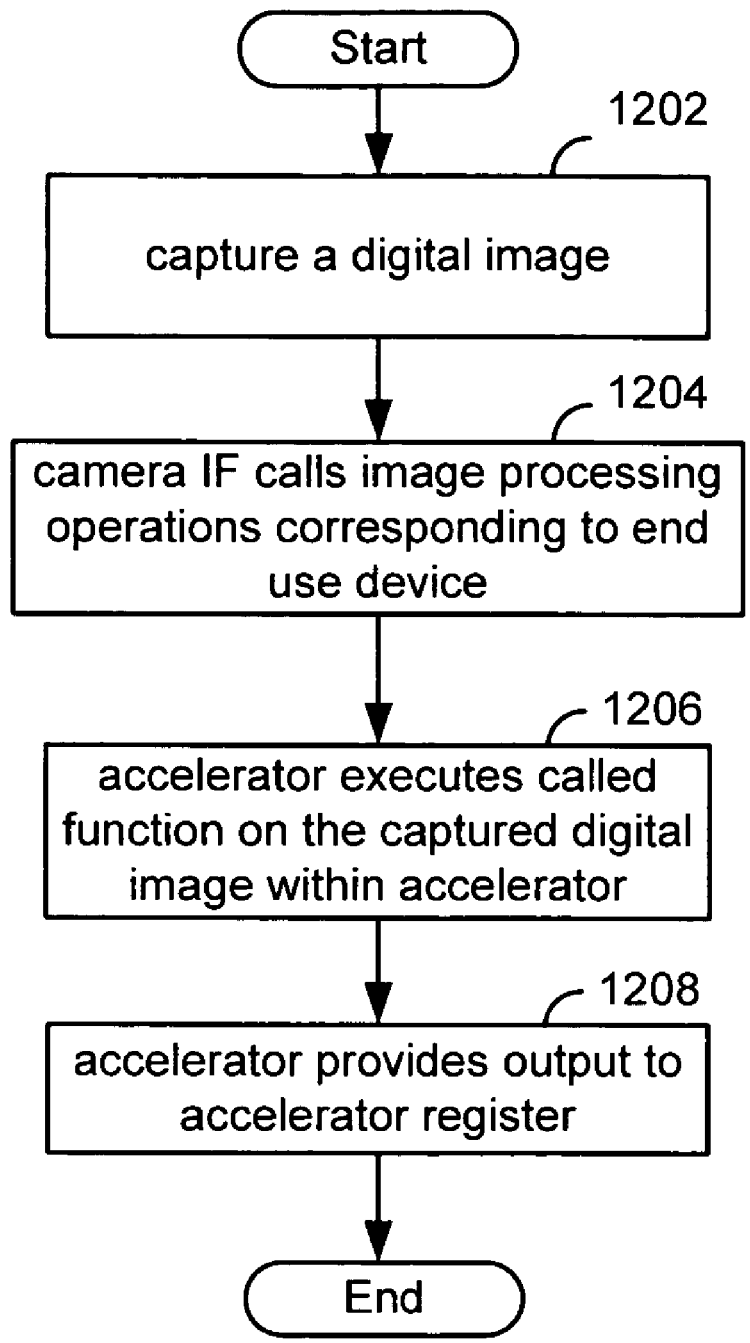
FIG. 12 provides a logical flow diagram indicating the control of process flows between the image processor and accelerator when performing format conversions or resolution conversion operations.

FIG. 12 provides a logic flow diagram illustrating the control procedures between the video processing module within the ARM and image process. These operations begin with the camera sensor or image capture device capturing a digital image in step 1202. The camera interface sets the parameters for the image process accelerator module to perform image processing operations on a macro block in step 1204. These image processing operations may include format conversions, processing an image to the required resolution of the client device, dithering, and/or conversion from YUV12 format to RGB color format, and noise reduction. This involves setting the appropriate parameters for the image process accelerator. These parameters configure the accelerator to operate in a predetermined way. Then the ARM calls the specified function corresponding to the set parameters in step 1204. The accelerator executes the called functions corresponding to the parameters within the dedicated accelerator hardware in step 1206. The results of this called function are then provided in an output accelerator register or designated memory location in step 1208. Concurrently to steps 1202 through 1208, the ARM of the video processing module is free to perform other tasks and then retrieve the results from the accelerator when needed. The encoder may then repeat these steps as needed. Further, should multiple client devices such as displays or encoders both require formats or resolutions that differ from that of the captured digital image, the camera interface may require the processing required for each client device be completed prior to continuing to process the next captured digital image.

In summary, the present invention provides a camera operably coupled to a configurable camera interface within a wireless terminal operable process images in accordance with multiple data formats. This camera interface has an ARM and an image process accelerator operably coupled to the ARM. The combination of the ARM and the accelerator receives an output or captured digital image having a first data format from an image sensor operably coupled to the camera interface. The accelerator is configured based on information contained within the captured digital image. The captured digital image will be processed to produce additional digital images having a differing data formats. The captured digital image and/or additional digital images will be supplied to multiple devices or clients. This configuration allows the compute intensive operations to be offloaded from the processing module onto the image process accelerator within the camera interface in order to improve the overall system efficiency. Such a combination may overcome the shortcomings of prior devices by utilizing a distinct and dedicated hardware accelerator to support real time or near real time digital image processing within a wireless device.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A configurable camera interface within a wireless terminal operable to process images in accordance with multiple data formats, the configurable camera interface comprising:
   an advanced reduced instruction set computer (RISC) machine (ARM); and
   an image process accelerator operably coupled to the ARM, wherein a combination of the ARM and the image process accelerator supports substantially real time digital image processing of the captured digital image into the multiple data formats within the wireless terminal, the combination of the ARM and the image process accelerator operable to:
   receive an output of an image sensor operably coupled to the configurable camera interface, wherein the image sensor is operable to capture a digital image having a first data format of the multiple data formats;
   determine a mode of operation of the configurable camera interface from information contained within the captured digital image, wherein the information includes data format information;
   process in substantially real time, based on the determined mode of operation, the captured digital image to produce a second digital image having a second data format of the multiple data formats by dividing the processing between the ARM and the image process accelerator, wherein the first data format and second data format differ;
   output the captured digital image to a first client device compatible with the first data format of the multiple data formats; and
   output the second digital image to a second client device compatible with the second data format of the multiple data formats, wherein the second client device prepares the second digital image for wireless transmission by the wireless terminal over reverse link communications to a multimedia capable device.

2. The configurable camera interface of claim 1, wherein the multiple data formats comprise:
   an RGB format;
   a UYVY format;
   a YUV12 format; or
   a YUV format.

3. The configurable camera interface of claim 1, wherein the first client device includes a preview display and the second client device includes a digital image encoder.

4. The configurable camera interface of claim 1, wherein when the first data format is a RGB format, the image process accelerator converts the captured digital image from the RGB format to a YUV format.

5. The configurable camera interface of claim 1, wherein when the first data format is a YUV format, the image process accelerator converts the captured digital image from the YUV format to an RGB format.

6. The configurable camera interface of claim 1, wherein the image process accelerator operates to decimate the captured digital image based upon a resolution difference between the captured digital image and the first client device.

7. The configurable camera interface of claim 1, wherein the captured digital image has a predetermined data format, and wherein the configurable camera interface divides the processing of the captured digital image between the ARM and image process accelerator based on the predetermined data format.

8. The configurable camera interface of claim 1, wherein the image process accelerator further comprises:
   at least one arithmetic logic unit (ALU) operable to perform at least one digital image processing task, and
   the at least one ALU couples to at least one register operable to temporarily store an input for or an output of the at least one ALU.

9. The configurable camera interface of claim 1 wherein the image process accelerator further comprises:
   a plurality of registers operably coupled to the ARM and accelerator, wherein the plurality of registers include:
      a configuration register that allows the ARM to command the image process accelerator to conduct a specific operation; and
      a buffer access register, wherein the image process accelerator is operable to write data thereto and to read the data therefrom.

10. The configurable camera interface of claim 1, wherein the wireless terminal operates according to a GSM standard.

11. A wireless terminal that comprises:
   a Radio Frequency (RF) front end;
   a baseband processor communicatively coupled to the RF front end;
   an image capture device operable to capture digital images;
   a configurable camera interface that includes an advanced reduced instruction set computer (RISC) machine (ARM) and an image process accelerator operably coupled to the ARM to support substantially real time digital image processing of the captured digital image into a plurality of data formats within the wireless terminal, wherein the configurable camera interface is operable to:
      receive the captured digital images having a first data format of the plurality of data formats;
      determine a mode of operation of the configurable camera interface from information contained within the captured digital images, wherein the information includes data format information;
      process in substantially real time, based on the determined mode of operation, each of the captured digital images to produce a second plurality of digital images by dividing the processing between the ARM and the image process accelerator based, each of the second plurality of digital images having a second data format of the plurality of data formats, wherein the first data format and second data format differ;
      output the captured digital images to a preview display compatible with the first data format of the plurality of data formats; and
      output the second plurality of digital images a client device compatible with the second data format of the plurality of data formats, wherein the client device prepares the second plurality of digital images for wireless transmission by the wireless terminal to a multimedia capable device via the baseband processor and the RF front end.

12. The wireless terminal of claim 11, wherein the plurality of data formats comprise:
   an RGB format;
   a UYVY format;
   a YUV12 format; or
   a YUV format.

13. The wireless terminal of claim 11, wherein the client device includes a digital image encoder.

14. The wireless terminal of claim 11, wherein the image process accelerator operates to decimate the captured digital image based upon a resolution difference between the captured digital image and the preview display.

15. The wireless terminal of claim 11, wherein the image process accelerator further comprises:
   at least one arithmetic logic unit (ALU) operable to perform at least one digital image processing tasks, the at least one ALU couples to at least one register operable to temporarily store an input for or an output of the at least one ALU.

16. The wireless terminal of claim 11, further comprising:
   a plurality of registers operably coupled to the ARM and image process accelerator, wherein the plurality of registers include:
      a configuration register that allows the ARM to command the image process accelerator to conduct a specific operation; and
      a buffer access register, wherein the image process accelerator is operable to write data thereto and to read the data therefrom.

17. The wireless terminal of claim 11, wherein the wireless terminal operates according to a GSM standard.

18. A method to process captured digital images within a wireless terminal comprising:
   capturing a digital image with an image capture device;
   determining a mode of operation of a configurable camera interface from information contained within the captured digital image, wherein the information includes data format information;
   performing, based on the determined mode of operation, substantially real time digital image processing of the captured digital image into multiple data formats by dividing the processing of the captured digital image between an advanced reduced instruction set computer (RISC) machine (ARM) and an image process accelerator based on the determined mode of operation of the captured digital image;
   processing the captured digital image to produce a second digital image having a second data format of a plurality of data formats based upon the determined mode of operation;

outputting the captured digital image to a first client device compatible with the first data format;

outputting the second digital image to a second client device compatible with the second data format; and wirelessly transmitting, by the second client device, the second digital image to a multimedia capable device.

19. The method of claim 18, wherein the image process accelerator further comprises:

at least one arithmetic logic unit (ALU) operable to perform at least one image processing tasks; and at least one register operable to temporarily store an input for or an output of the at least one ALU.

20. The method of claim 19, wherein compute intensive image processing tasks are assigned to the image process accelerator.

21. The method of claim 19, wherein the plurality of the data formats comprise:

an RGB format;
a UYVY format;
a YUV12 format; or
a YUV format.

22. The method of claim 19, wherein the first client device comprises:

a preview display and the second device comprises a digital image encoder.

23. The method of claim 19, wherein the image process accelerator is further operable to decimate the captured digital image based upon a resolution difference between the captured digital image and the first client device.

24. The method of claim 19, wherein the wireless terminal operates according to a GSM standard.

* * * * *

UNITED STATES PATENT AND TRADEMARK OFFICE
CERTIFICATE OF CORRECTION

PATENT NO. : 8,155,703 B2  
APPLICATION NO. : 10/956773  
DATED : April 10, 2012  
INVENTOR(S) : Jiankun Li Page 1 of 1

It is certified that error appears in the above-identified patent and that said Letters Patent is hereby corrected as shown below:

In the Claims:

Col. 16, line 4, after "output the second plurality of digital images" insert --to--  
Col. 16, line 29, after "at least one image processing" replace "tasks" with --task--  
Col. 17, line 11, after "at least one image processing" replace "tasks" with --task--

Signed and Sealed this  
Twenty-first Day of May, 2013

Teresa Stanek Rea  
*Acting Director of the United States Patent and Trademark Office*